Sept. 12, 1933.  A. L. LEMAN  1,926,856
CASING HEAD
Filed March 24, 1933
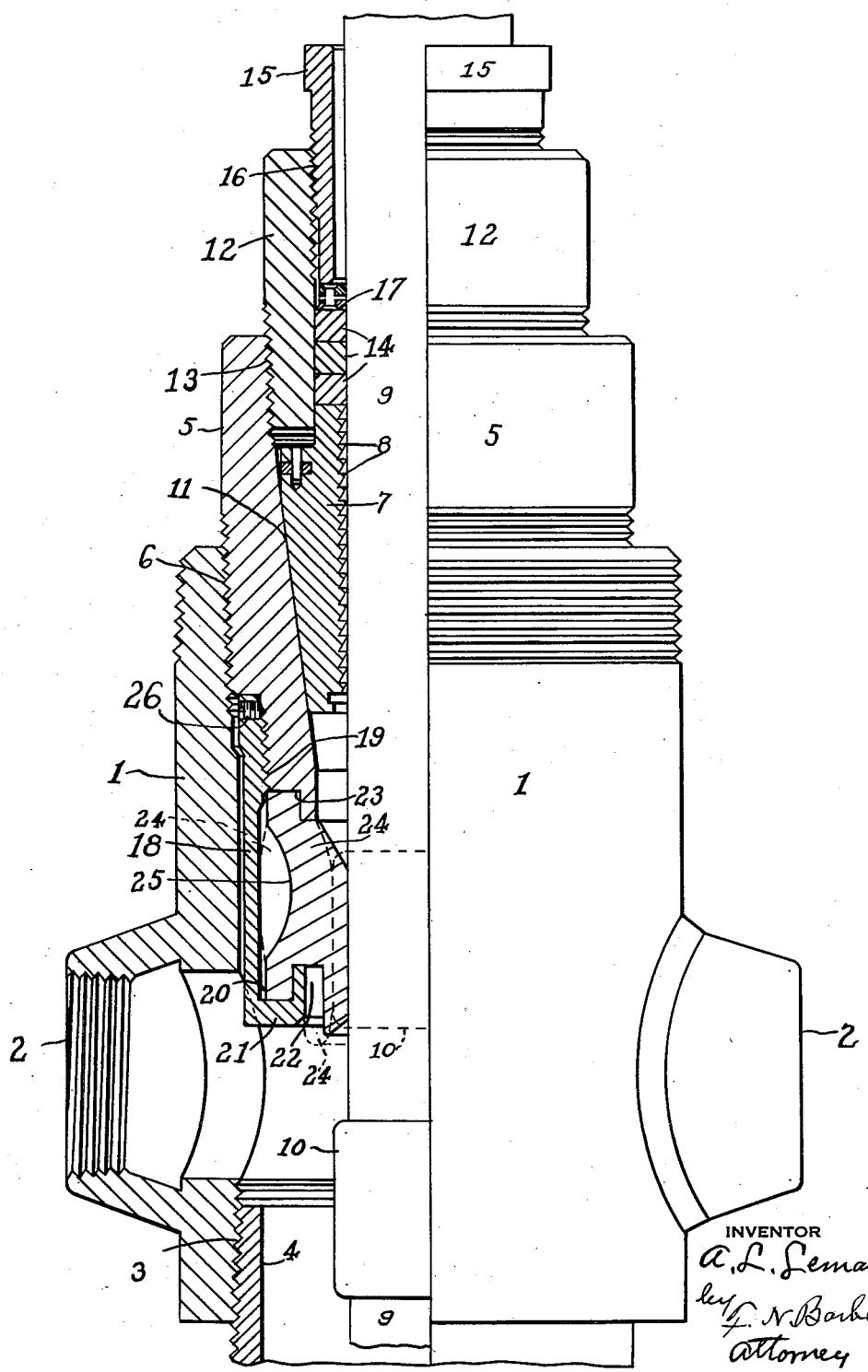
INVENTOR
A. L. Leman
by F. N. Barber
Attorney Patented Sept. 12, 1933

1,926,856

UNITED STATES PATENT OFFICE 1,926,856

CASING HEAD

Arthur L. Leman, Toledo, Ohio, assignor to The National Supply Company, Toledo, Ohio, a corporation of Ohio Application March 24, 1933. Serial No. 662,473

5 Claims. (Cl. 166—14)

My invention relates to casing heads, sometimes called tubing heads.

One object of this invention is to provide a casing head which is capable of maintaining a seal against the pressure between the tubing or tubing coupling and the body of the head at all times. Another object is to provide a casing head employing slip-suspension of the tubing with a packing above the slips, means for compressing the same, and flexible or yieldable sealing means below the slips to maintain a seal against the pressure between the tubing or tubing coupling and the body of the head at all times. My invention also comprises a novel support for a packing ring, the packing ring being flexible or yieldable so that in addition to sealing the tubing it will also seal the couplings on the tubing against leakage between the tubing and the body of the casing head.

The accompanying drawing shows on the right hand side an elevation and on the left hand side a central vertical section of a casing head involving my invention.

1 designates a hollow body or bowl having the side outlets or vents 2. The lower end of the casing head 1 is provided with internal threads 3 by which a string of casing represented by the numeral 4 is suspended.

An adaptor ring 5 is screwed into the upper portion of the body as shown by the threads 6. A number of slips 7 are inserted in the adaptor ring 5 and have teeth 8 to grip and support the tubing 9 provided with the coupling 10. The inner face of the adaptor ring 5 is tapered downwardly as shown at 11 while the outer faces of the slips 7 are correspondingly tapered to fit the taper in the adaptor ring.

A retaining ring 12 is screwed into the upper end of the adaptor ring 5 and may extend downwardly into recesses in the upper ends of the slips 7. The threads for connecting the adaptor ring and the retaining ring are shown at 13. 14 is a cylinder packing surrounding the tubing 9 and lying within the retaining ring 12. It rests upon the upper ends of the slips 7. A gland 15 adjustable in the upper end of the retaining ring 12 by means of the threads 16 bears upon the upper face 17 of the packing 14 to compress the same and form a tight seal between the tubing 9 and the retaining ring 12.

A tubular packer support 18 is adjustably screwed on the threads 19 in an annular recess in the lower end of the adaptor ring 5. The lower end of the packer support has an annular recess 20 open upwardly and closed below by the bottom extension 21 of the support. The inner edge of the extension 21 is provided with an upstanding flange 22 which with the extension 21, and the wall of the support 18 forms the annular recess 20. The lower end of the adaptor ring 5 has at its lower outer corner an annular recess 23. This recess receives the upper end of a flexible or yieldable sealing ring 24 whose lower end has an annular flange fitting in the annular recess 20. The sealing ring extends inwardly so as to closely engage the outer surface of the tubing 9. The sealing ring 24 has a central peripheral groove 25 adjacent to the tubular packer support 18. The upper portion of the sealing ring rests against the lower end of the adaptor ring 5 and upon the upper edge of the flange 22, as well as in the upper end of the annular recess 23 and the lower surface of the recess 20.

I have shown in dotted lines the coupling 10 seated directly against the sealing ring 24. As the coupling is larger than the tubing 9 it stretches or distorts the sealing ring outwardly radially to take up much of the groove 25. It is thus seen that the tubing with the coupling 10 thereon can be moved up and down through the casing head without breaking the seal between the coupling 10 and the sealing ring 24. After the coupling passes the sealing ring the latter will expand inwardly so as to form a seal against the outer surface of the tubing 9.

A marked advantage of the construction described is the ease of assembly of the flexible sealing member or ring 24. This ring is first inserted in the packer support 18 before the latter is screwed upon the adaptor ring 5. When the support 18 has been sufficiently screwed upon the adaptor ring 5, the latter with the support 18 and the sealing ring 24 therein can be readily inserted into the casing head 1. In order to prevent any accidental turning of the support 18, I have provided one or more set screws 26 in the upper end of the support 18 to be screwed up against the adaptor ring 5 as shown.

I claim:—

1. A casing head comprising a body having an axial bore, an adaptor ring secured within the bore at the upper end of the body, slips supported by the ring and adapted to surround and suspend a well tubing, means above the slips to provide a seal between the tubing and the ring, and a flexible sealing ring below said slips to provide a seal between the tubing and the body, the sealing means engaging the exterior wall of the tubing and being flexible to permit a coupling on the tubing to pass through with a sealing fit.

2. A casing head adapted to be secured to the upper end of a well casing including a bowl, an adaptor ring secured within the upper end of the bowl, slips supported by the ring and adapted to surround and suspend a well tubing having couplings thereon, means above the slips to provide a seal between the tubing and the ring, and means below the slips to provide a seal between the tubing or the coupling and the bowl, the sealing means being flexible to elastically grasp the outer surface of the tubing and to expand radially to permit the couplings on the tubing to pass with a sealing fit.

3. A casing head comprising a hollow annular vented body, an adaptor ring secured within the upper end of the body, slips supported by the ring for suspending a well tubing having couplings thereon, a retaining ring above the slips supported by the adaptor ring, packing above the slips positioned between the retaining ring and the tubing, a gland adjustable in the retaining ring for compressing the packing, a packer support adjustably secured to the lower end of the adaptor ring, and a flexible sealing member secured between the lower end of the adaptor ring and the packer support and normally contacting with the tubing, the sealing member being capable of stretching to allow the passage of the said tubing coupling therethrough while maintaining a sealing fit therewith.

4. A casing head comprising a body having an axial bore, an adaptor ring secured within the bore at the upper end of the body, slips supported by the ring and adapted to surround and suspend a well tubing, means above the slips to provide a seal between the tubing and the ring, a tubular packer holder adjustably connected to the lower end of the adaptor ring and having at its lower end an annular upwardly-open groove therein, and an annular flexible packing ring adapted to surround and form a seal with the outer surface of the tubing and having its lower end confined in the groove, the packing being expansible radially to allow a coupling in the tubing to pass with a sealing fit.

5. A casing head comprising a body having an axial bore, an adaptor ring secured within the bore at the upper end of the body, slips supported by the ring and adapted to surround and suspend a well tubing, means above the slips to provide a seal between the tubing and the ring, a tubular packer holder adjustably connected to the lower end of the adaptor ring and having at its lower end an annular upwardly-open groove therein, and an annular flexible packing ring adapted to surround and form a seal with the outer surface of the tubing and having its lower end confined in the groove, the packing being grooved circumferentially intermediate its ends to allow it to expand radially and permit a coupling on the tubing to pass with a sealing fit.

ARTHUR L. LEMAN.